(12) United States Patent
Lalumandier et al.

(10) Patent No.: US 7,255,608 B2
(45) Date of Patent: Aug. 14, 2007

(54) CONNECTOR ASSEMBLY AND METHOD HAVING SEGMENTED BODY PORTION

(75) Inventors: Monroe A. Lalumandier, Harvester, MO (US); James V Leonard, St. Charles, MO (US); Richard E Meyer, Florissant, MO (US); William J Ebert, Kirkwood, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/124,532

(22) Filed: May 5, 2005

(65) Prior Publication Data

US 2006/0252312 A1    Nov. 9, 2006

(51) Int. Cl.
*H01R 13/502* (2006.01)

(52) U.S. Cl. ............... 439/686; 439/660; 439/701; 439/717

(58) Field of Classification Search ......... 439/686, 439/660, 701, 717
See application file for complete search history.

(56) References Cited

U.S. PATENT DOCUMENTS 3,848,951 A * 11/1974 Michaels et al. ........... 439/357
4,902,092 A * 2/1990 Grandy ..................... 385/56
4,981,446 A    1/1991 Lazaro, Jr. et al.
4,998,889 A    3/1991 Moly
5,088,191 A    2/1992 Lazaro, Jr. et al.
5,281,147 A * 1/1994 Hughes ...................... 439/35

FOREIGN PATENT DOCUMENTS

| EP | 0490698 | 6/1992 |
| EP | 0548942 | 6/1993 |
| GB | 836606 | 6/1960 |
| GB | 902695 | 8/1962 |
| GB | 2311665 | 10/1997 |
| GB | 2347282 | 8/2000 |
| WO | WO 92/22943 | 12/1992 |

* cited by examiner

*Primary Examiner*—Tho D. Ta
*Assistant Examiner*—Vanessa Girardi
(74) *Attorney, Agent, or Firm*—Harness, Dickey & Pierce, P.L.C.

(57) ABSTRACT

A connector body component for a connector assembly in which the connector body component has a plurality of independent body segments secured together to form a single assembly. The connector body segments are held together within a housing member and may include interlocking structures on wall surfaces thereof. Forming the connector body in independent segments allows one body segment to be replaced in the event of damage to the connector body or one conductive element held in the connector body, thus eliminating the need to replace the entire connector body. This saves significant time and expense when repairing or modifying a connector body having a plurality of independent conductors coupled to it.

23 Claims, 3 Drawing Sheets

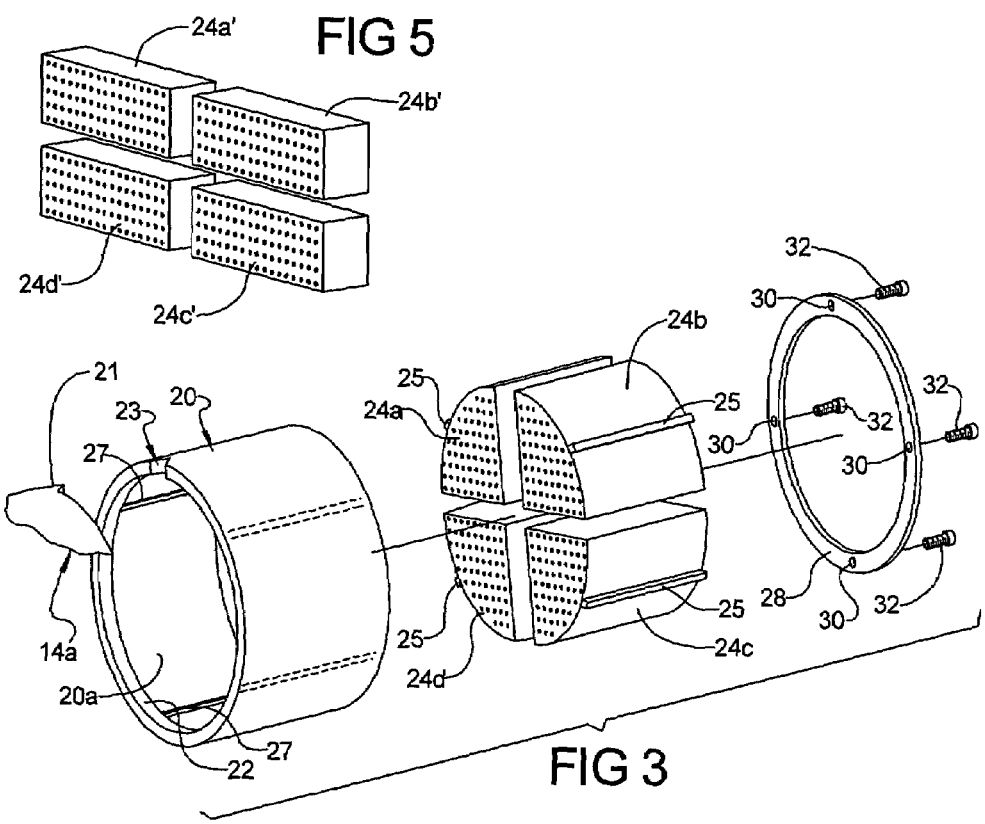
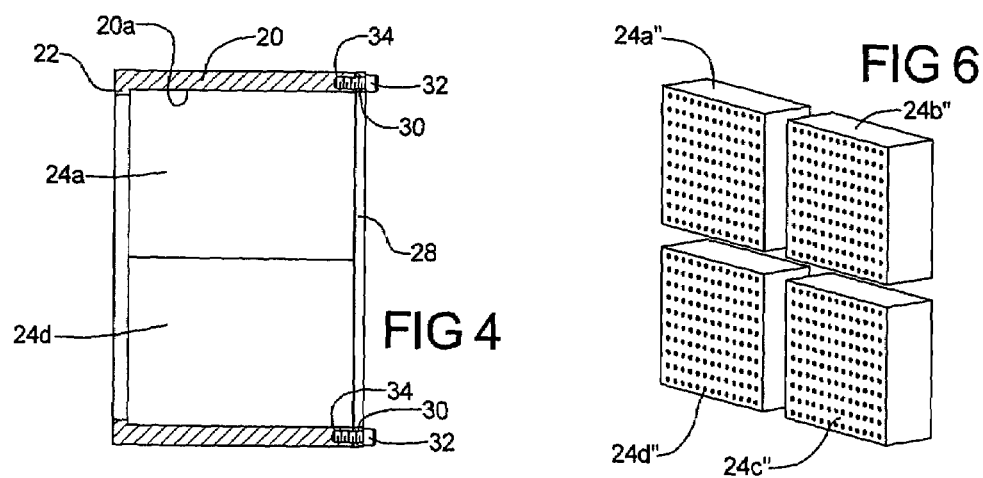

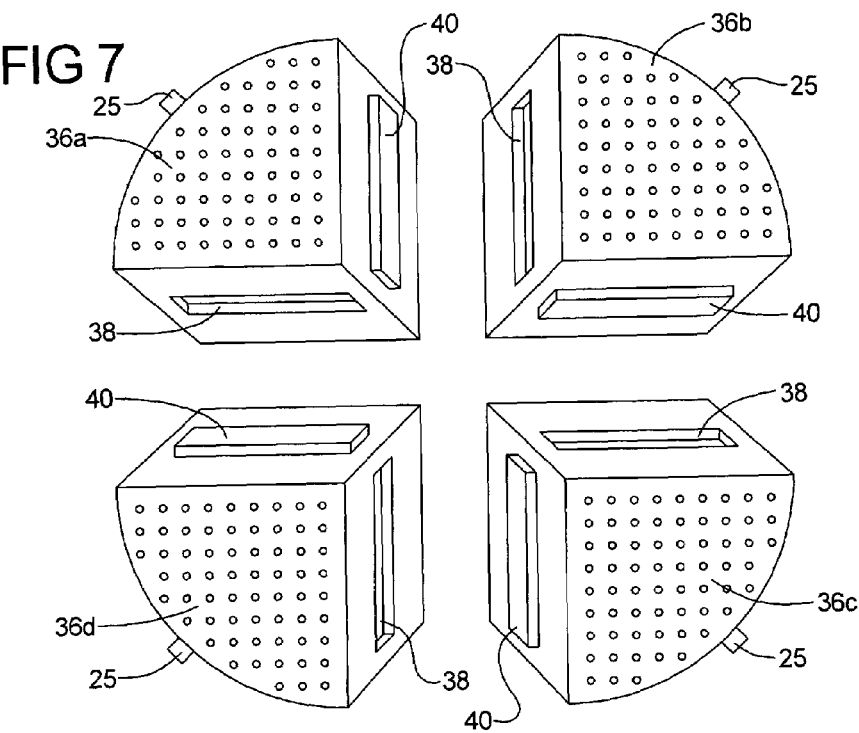
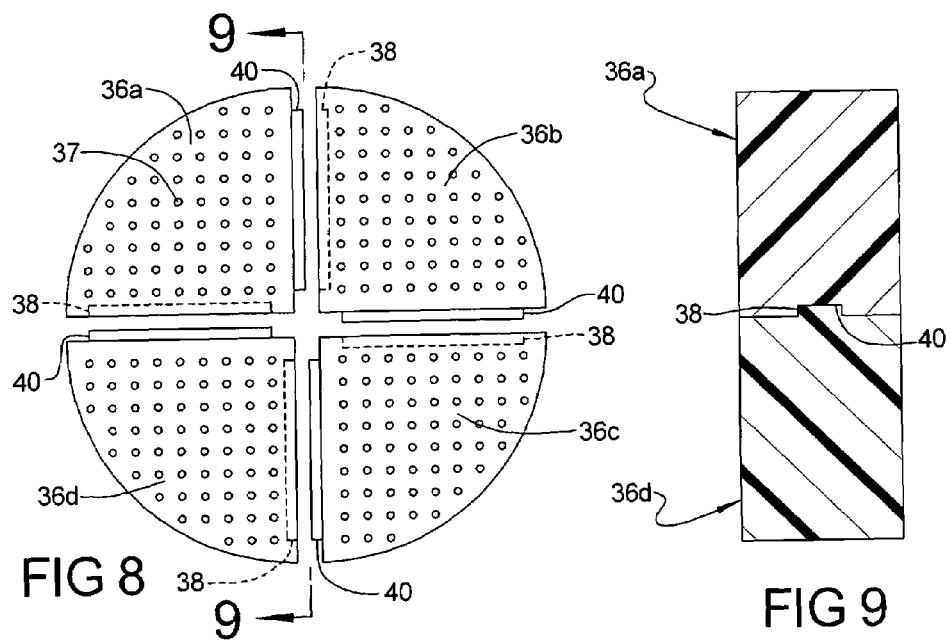

CONNECTOR ASSEMBLY AND METHOD HAVING SEGMENTED BODY PORTION

FIELD OF THE INVENTION

The present invention relates to connector assemblies, and more particularly to a connector assembly having at least one connector body that includes a plurality of independently removable and replaceable segments.

BACKGROUND OF THE INVENTION

Military and commercial electronics often employ cabling or wiring harnesses for transmitting electrical or optical signals. Such cabling and wiring harnesses often have connections at a termination point that can be disconnected and reconnected through the use of electrical plugs such as connector assemblies. Many such connector assemblies have a male component and a female component that are joined together to complete one or more circuits. Typically the male connector includes one or more electrical or optical conductors, and the female connector includes one or more receptacles for receiving the conductors of the male connector portion. When joining a male and female connector portions together, it is crucial that each of the conductors of the male member make contact with the appropriate structure within each opening in the female connector. Present day connector assemblies have mating tabs and grooves on the connector body mating surfaces. This assures that the pattern of pins on one connector body is precisely aligned and matched with the pin receptacles on the mating connector body, as the connector plug is inserted into the connector receptacle. These tabs also are used as retention pins to help hold the plug and receptacle together. Typically, when an electrical connector is involved, the female connector includes conductive contacts in a recess (i.e., receptacle) that receive conductive pins of the male connector.

On occasion, one or more of the conductive elements within the male or female connector components will become damaged and need repair. When such damage to a connector occurs, the normal procedure is to replace the defective conductive part. This may involve replacing defective contacts in the female connector component or replacing one or more pins in the male connector component. Damage can also extend to other parts such as a portion of the connector body of either the male or female connector. When there is damage to either of the male or female connectors, whether the damage is to a single conductive pin, a single conductive contact or a plurality of defective pins or contacts, repairing or replacing the defective pin or contact can be a time consuming process. Such repair may involve significant man hours in replacing the damaged pin or conductor and performing verification of all connections. If there is damage to the body of the connector, then the entire body has to be replaced, which represents removing and reattaching all of the conductors to the new connector body. When such damage occurs to a connector having dozens or more of individual conductors, one can appreciate the significant time and costs that can be incurred in the repair process.

Accordingly, there still exists a need for a connector assembly that can be repaired more quickly and easily in the event one or more conductive elements or the body portion of the assembly become damaged and need to be replaced.

SUMMARY OF THE INVENTION

The present invention is directed to a connector assembly that incorporates at least one connector body portion that is formed from a plurality of independently replaceable connector body segments. Each connector body segment includes one or more conductors. The conductors may be conductive pins or conductive contacts housed within openings in the segment. Since the connector body is segmented into a plurality of independent component parts, if one of the connector body segments becomes damaged, it is not necessary to replace the entire connector body. Rather, only the segment containing the damaged pin or contact needs to be replaced. This significantly reduces the time to repair the damaged connector. For example, when a four segment connector body is incorporated, and one of the segments of the connector body becomes damaged, only the conductors associated with that particular damaged segment need to be removed and reattached to a new segment of the connector body. This reduces the overall time to repair the connector body by 75% over what would be required if all of the conductors of all four segments the connector body needed to be removed and reattached to a single new connector body.

In various preferred embodiments different shapes of connector bodies are employed. The independently replaceable segments of the connector body may be precisely positioned and held together with an interlocking structure formed on outer surface portions of each connector body segment. The interlocking structure allows selected ones of the connector body segments to be removed from the remaining segments and replaced when needed. The ability to replace only a portion of the connector body also enables modifications to the connector to be implemented more easily, quickly and cost effectively than would be the case if the entire connector body had to be replaced.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 3 is an exploded perspective view of the first connector body shown in FIG. 1;

FIG. 4 is a simplified side cross sectional view of the assembled connector body of FIG. 3 to illustrate the engagement of the fasteners and the housing;

FIG. 5 is an illustration of a plurality of rectangular shaped connector body segments in accordance with an alternative preferred form of the connector body;

FIG. 6 is a perspective view of another alternative preferred form of the connector body in which the body segments are square shaped;

FIG. 7 is a perspective view of a plurality of connector body segments in accordance with another alternative preferred embodiment of the present invention, wherein each connector body segment incorporates both a groove and a tab for enabling interlocking of the body segments with one another;

FIG. 8 is a front view of the connector body segments shown in FIG. 7 lined up to be coupled together; and FIG. 9 is a side cross sectional view of the connector body of FIG. 8 showing two of the body segments assembled together.

DETAILED DESCRIPTION OF THE PREFERRED EMBODIMENTS

The following description of the preferred embodiment(s) is merely exemplary in nature and is in no way intended to limit the invention, its application, or uses.

Figure 1:
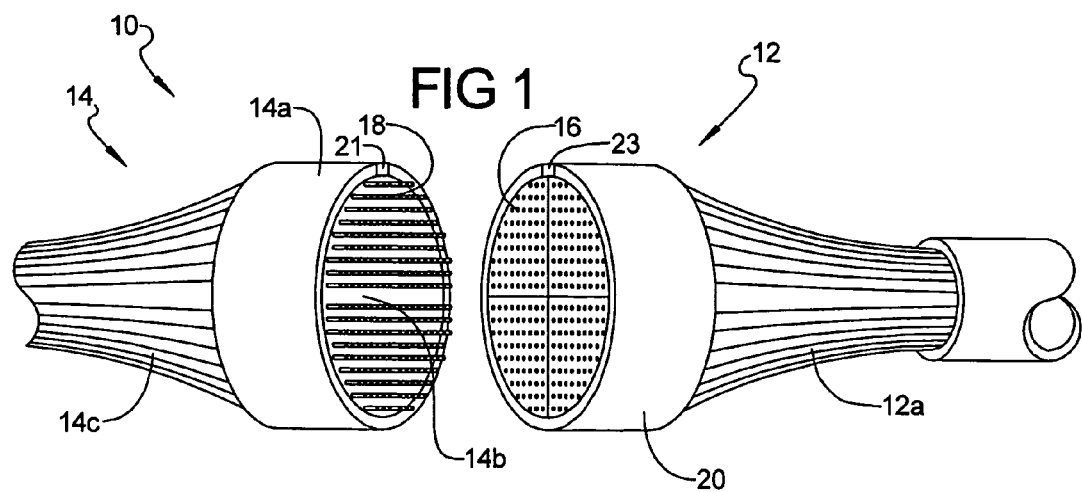
FIG. 1 is a perspective view of a connector assembly in accordance with a preferred embodiment of the present invention.

Referring to FIG. 1, there is shown a connector assembly 10 in accordance with a preferred embodiment of the present invention. The connector assembly includes a first connector body 12 and a mating second connector body 14. Connector body 12 is illustrated as having a plurality of electrically conductive pin receptacles 16, while second connector body 14 has a housing 14a and a body segment 14b having a plurality of electrical conductor pins 18. It will be appreciated, however, that the connector system 10 could be configured such that the conductor pins 18 are included within the first connector body 12 and pin receptacles 16 are formed as part of the second connector body 14. Alternatively, connector body 14 could also be formed as a segmented assembly with the same number, or a different number of body segments as connector body 12. The preferred embodiment shown in FIG. 1 is therefore intended merely for illustrative purposes as to one preferred implementation of the connector assembly 10. Each pin receptacle 16 essentially forms an opening that has an electrically conductive sleeve or socket (not shown) inserted in it. Each sleeve or socket is electrically coupled to a wire, and the wires collectively form a wiring harness 12a. Similarly, each pin 18 is coupled to a wire, and the wires collectively form a wiring harness 14c.

Figure 2:
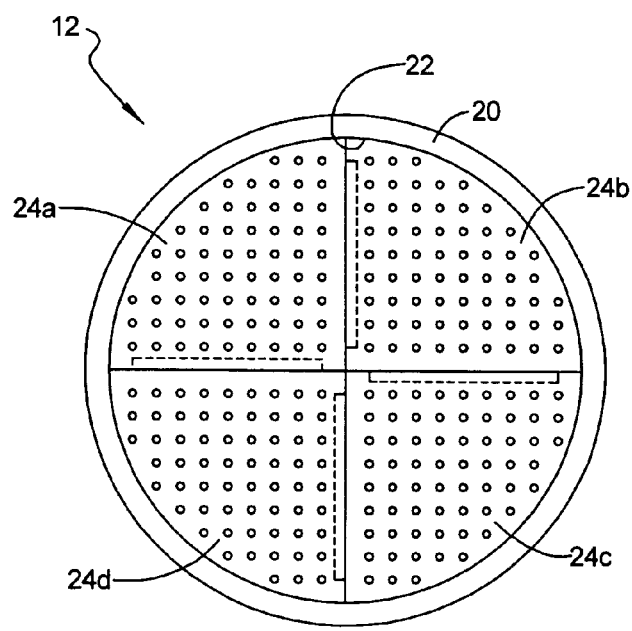
FIG. 2 is a front end view of the first connector body shown in FIG. 1.

With reference to FIGS. 2-4, connector body 12 includes a circular connector housing 20 having a flange 22. The housing 20 holds a plurality of four pie-shaped connector body segments 24a-24d positioned adjacent one another to form a circular configuration. Again, a circular configuration is merely for illustrative purposes, and a greater or lesser plurality of independent body segments may be included. Moreoever, the body segments need not be pie-shaped, but rather might be square, rectangular, or form any other geometric shape needed to form a desired/needed shape. FIG. 5 illustrates connector body segments 24a'-24d' as an illustration that each of the body segments 24 could be rectangular shaped. FIG. 6 illustrates segments 24a"-24d" as being square shaped. Other possible shapes could be triangular, hexagonal, or pentagonal, just to name a few. The body segments 24, 24' and 24" are preferably formed from high strength plastic such as Diallyl Phthalate, or even possibly from other metal or non-metal materials.

Referring further to FIGS. 3 and 4, the connector body segments 24a-24d can be seen in greater detail. Each connector body segment 24a-24d preferably includes a tab or rib 25 extending along a portion of its circumferential wall portion. A tab 23 can also be formed at a precise position on the housing 20 (e.g., at the 12:00 o'clock position), and a mating notch 21 formed on the housing 14a to enable precise alignment of the pins 18 to the receptacles 16 when the connector bodies 12 and 14 are matingly engaged. The housing 20 preferably includes a plurality of grooves 27 formed on an interior wall portion 20a thereof. The connector body 12 also includes a retaining ring 28 having a plurality of openings 30. Threaded fasteners 32 extend through the openings 30 and into separate threaded blind holes 34 (FIG. 4) in the housing 20. While only two holes 34 are visible in FIG. 4, it will be appreciated that four such holes are employed to each receive one of the fasteners 32. When the independent body segments 24a-24d are inserted into the housing 20, they are positioned closely adjacent one another to form essentially a single, unitary connector body. Ribs 25 help to precisely locate the body segments 24a-24d relative to the housing 20, and to key the position of the body segments 24a-24d to the tab 23.

A principal advantage of the connector body 12 is that if one of the body segments 24a-24d is damaged, then the entire connector body portion does not need to be replaced. Rather, only the damaged connector body segment needs to be removed and replaced. Forming the connector body portion as a plurality of independent body segments also allows easier updating of the connector body in the event modifications need to be made to one or more pin receptacles 16 because of changes to a portion of the wiring harness 12a. For example, if only connector body segment 24a becomes damaged, there is no need to remove and reconnect the wires connected to the pin receptacles 16 in body segments 24b-24d; only those wires connected to pin receptacles 16 of the damaged body segment 24a need to be disconnected and re-connected to a new body segment 24a. With a four segment connector body, this reduces the repair time by 75%. Similarly, if modifications to only one or more pin receptacles in body segment 24a are required (such as coupling different gage wiring to one or more pin receptacles), then the time needed to implement this modification would be reduced by 75% over that which would be needed if all of the pin receptacles 16 needed to be re-wired. Accordingly, the connector body 12 can be repaired/altered/updated as needed with much greater ease and more quickly than would be the case if the entire connector body portion needed to be replaced because of repair or modification to only a few select pin receptacles 16.

Referring to FIGS. 7 and 8, a plurality of connector body segments 36a-36d are illustrated to show an alternative preferred form of the body segments. Connector body segments 36a-36d each include a plurality of pin receptacles 37. Each body segment 36a-36d also includes a groove or recess 38 and a protruding tab 40 formed on adjacent planar wall portions. The recesses or grooves 38 interlock with the tabs 40 when the connector body segments 36a-36d are assembled together. FIG. 9 shows the interlocking of one groove 38 and one tab 40 to help hold the connector body segments 36a-36d in precise alignment with one another. It will be appreciated that any form of tongue and groove arrangement could also be implemented to allow the connector body segments 36a-36d to be slidably engaged with one another. Also, such an interlocking tongue and groove arrangement could be formed on interior facing surfaces of the body segments.

The connector body 12 of the present invention also provides the advantage of enabling one of the connector body segments 24 to be assembled at a different work area or work station than the remainder of the body segments, and then all of the body segments 24 can be brought to a central location for final assembly. In some instances this may simplify and ease construction of the connector body 12 because all of the conductors needed to assemble the connector body component would not be required to be located in a single area.

The various preferred embodiments have been described as forming an electrical connector body. However, it will be appreciated that the present invention could just as readily be implemented in optical applications, as well as virtually any other application where a plurality of independent connections need to be made via a pair of coupled connectors. The present invention is also not limited to use with pin or blade type conductors, but could also be implemented with a connector assembly having flat, abutting conductive contact elements.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An electrical connector assembly comprising:
   a first connector body having a plurality of first conductors; and
   a second connector body having a plurality of second conductors adapted to engage with said first conductors,
   said second connector body being segmented into a plurality of independently removable and replaceable body segments, each having an interior surface and an exterior surface, the body segments held so that each of the interior surfaces are adjacent to each other, and releasable from one another, to form an integral connector body assembly;
   each of said body segments of said second connector body including a first alignment element formed along the exterior surface thereof;
   said connector assembly including a housing for receiving said body segments, said housing including a plurality of second alignment elements for engaging with said first alignment elements to thus locate said connector body segments in a desired orientation within said housing when said connector assembly is assembled;
   a uniform retaining member coupled to said housing to retain said body segments within said housing;
   said housing including a locating element, said plurality of second alignment elements being located in relation to the locating element; and
   said locating element being adapted to engage with the first connector body when said first and second connector body segments are coupled together to precisely locate said second conductors relative to said first conductors.

2. The electrical connector assembly of claim 1, wherein said first conductors comprise a plurality of conductor pins.

3. The electrical connector assembly of claim 1, wherein said second conductors comprise a plurality of conductive pin receptacles, each for receiving a mating conductive pin.

4. The electrical connector assembly of claim 1, wherein said independently removable and replaceable body segments are removably secured to one another with interlocking structures formed on the interior surfaces of said body segments.

5. The electrical connector assembly of claim 1, wherein said first and second connector bodies each comprise a circular shape.

6. The electrical connector assembly of claim 1, wherein said first and second connector bodies each comprise a rectangular shape.

7. The connector assembly of claim 1, wherein said first alignment elements comprise ribs, and said second alignment elements comprise grooves formed in an interior wall portion of said housing.

8. The electrical connector assembly of claim 1, wherein each of said body segments further comprise a structure for enabling each of said body segments to interengage with an adjacent body segment to hold said body segment in alignment with said adjacent body segment.

9. The electrical connector assembly of claim 8, wherein said first conductors and said second conductors are oriented to extend in a linear direction when engaged and the interengageable structures of each of said body segments are orientated to extend in a direction generally transverse to said direction of said first conductors and said second conductors.

10. The electrical connector assembly of claim 8, wherein said body segments comprise at least four body segments, with a pair of interengageable structures positioned between each said body segment and each said adjacent body segment.

11. The electrical connector assembly of claim 8, wherein the interengageable structures comprise a tab and a groove.

12. The electrical connector assembly of claim 11, wherein said tab and said groove each extend for a length corresponding to at least 50% of a corresponding outer length of each of said body segments.

13. A connector component comprising:
   a connector body having a plurality of conductors,
   said connector body being segmented into a plurality of independently removable and replaceable body segments, with each said body segment having a subplurality of said conductors, said body segments each including an interior surface and an exterior wall portion;
   a housing for receiving said body segments to hold said interior surfaces of the body segments together adjacent one another, said housing forming at least a portion of said connector body;
   a uniform retaining member coupled to said housing to retain said body segments within said housing;
   said body segments each including an alignment element formed along the exterior wall portion;
   said housing including alignment portions for engaging said alignment elements to key said body segments to said housing; and
   any one of said body segments being removable from the remaining ones of said body segments to enable a different body segment to be re-secured to said remaining ones of said body segments to facilitate at least one of repair and modification of said connector body.

14. The connector body of claim 13, wherein said connector body comprises a round shape.

15. The connector body of claim 13, wherein said connector body comprises a rectangular shape.

16. The connector body of claim 13, wherein said connector body comprises a square shape.

17. The connector component of claim 13, further comprising a second connector body including a second housing, first housing and said second housing enclose respective body segments and holding respective body segments at a predetermined position.

18. The connector body of claim 13, wherein said independently removable body segments are secured together so that the interior surfaces of each body segment are adjacent to each other by interlocking structures formed on the interior surfaces of said body segments.

19. The connector body of claim 18, wherein said interlocking structures comprise tabs and grooves formed on the interior surface portions of each of said body segments.

20. The connector body of claim 18, wherein the uniform retaining member further comprises a retention ring securable to said housing for capturing said body segments within said housing.

21. The connector body of claim 20, further comprising at least one fastener which affixes said retention ring to said housing to hold said body segments at a predetermined position in said housing.

22. A method of forming a connector assembly, comprising:

forming a first connector body having a plurality of conductive elements;

forming a second connector body having a plurality of conductive elements;

further forming said second connector body as a plurality of independently replaceable body segments, each with an interior surface and an exterior surface, the interior surfaces held adjacent one another to form said second connector body;

forming a locating element on the housing to couple said second connector body to said first connector body;

forming a first alignment structure on each of said body segments along the exterior surface of each of the body segments;

forming at least one second alignment structure on an inner surface of a housing for receiving said body segments so that said connector body is keyed at a desired orientation within said housing;

coupling a uniform retaining member to a surface of said housing to retain said body segments within said housing.

23. The method of claim 22, further comprising:

forming a plurality of second alignment components on a housing portion that supports said body segments, said second alignment components operating to engage with said first alignment components to key said body segments to said housing.

* * * * *